(12) United States Patent
Zhuk

(10) Patent No.: US 8,051,026 B2
(45) Date of Patent: Nov. 1, 2011

(54) RULES COLLECTOR SYSTEM AND METHOD WITH USER INTERACTION

(75) Inventor: Yefim Zhuk, Englewood, CO (US)

(73) Assignee: The Boeing Company, Chicago, IL (US)

(*) Notice: Subject to any disclaimer, the term of this patent is extended or adjusted under 35 U.S.C. 154(b) by 869 days.

(21) Appl. No.: 11/948,119

(22) Filed: Nov. 30, 2007

(65) Prior Publication Data

US 2009/0144219 A1 Jun. 4, 2009

(51) Int. Cl.
*G06F 17/00* (2006.01)
*G06N 5/02* (2006.01)

(52) U.S. Cl. .......................................... 706/47
(58) Field of Classification Search ............... 706/47
See application file for complete search history.

(56) References Cited

U.S. PATENT DOCUMENTS 6,321,217 B1 * 11/2001 Maeda et al. ............... 706/47
2002/0099679 A1 * 7/2002 Usitalo et al. ............... 706/46

OTHER PUBLICATIONS

Tecuci "Building Knowledge Bases through Multistrategy Learning and Knowledge Acquisition", in Tecuci & Kodratoff (eds.) Machine Learning and Knowledge Acquisition: Integrated Approaches, pp. 13-50, Academic Press, 1995.*

Cycorp, Inc. http://cyc.com, website printout dated Mar. 28, 2008, 1 page.

Automating Smarter Decisions http://www.fairisaac.com/fic/en/our-approach/business-rules/ website printout dated Mar. 28, 2008, 3 pages.

Inference Engine http://www.emclab.mst.edu/consortium/Whatis/node17.html website printout dated Mar. 28, 2008, 1 page.

* cited by examiner

*Primary Examiner* — Jeffrey A Gaffin
*Assistant Examiner* — Li-Wu Chang
(74) *Attorney, Agent, or Firm* — Harness, Dickey & Pierce, P.L.C.

(57) ABSTRACT

A rules collector system and method. The system and method enables a process of capturing an expertise of an individual in a formalized manner, and which may update rules and knowledge databases with information based on the interaction with the individual. The system includes a rules retrieval coordinator responsive to an input from an individual and adapted to provide relevant information to the individual based on the input and to enable a bidirectional information exchange with the individual. A rules input processor is used for monitoring responses from the individual and generating one of a plurality of different outputs depending on the responses. A rules generator is responsive to the rules input processor and is used to form one or more new rules based on the responses from the individual. A rule integrity check subsystem automatically checks integrity of the new rule based on pre-existing rules.

19 Claims, 3 Drawing Sheets

RULES COLLECTOR SYSTEM AND METHOD WITH USER INTERACTION

FIELD

The present disclosure relates to rules collector systems and methods, and more particularly to a rules collector system and method that enables a process of capturing an expertise of an individual in a formalized manner, and which may update rules and knowledge databases with information based on the interaction with the individual.

BACKGROUND

The statements in this section merely provide background information related to the present disclosure and may not constitute prior art.

Knowledge workers, like data analysts, etc. are often engaged in manual processes based on a set of rules that are never formalized but rather accumulated over time as specific expertise in an area develops. Current technology allows one to populate rules engines, knowledgebase, etc. with known rules. However, such systems do not allow an individual's knowledge to be formalized, so that knowledge can be used to continually update the system, preferably automatically, as continued use of the system by one or more individuals occurs. More specifically, such present day systems do not provide any operating capability that could be viewed as a "conversational mode", where questions, remarks, or data provided by an individual triggers different, intelligent responses from the system. Still further, such present day systems do not provide the capability to be continuously updated with new information based on a prior conversational exchange with an individual.

Present day rules engines and knowledge based systems also do not provide the capability of enabling newly formulated rules to be immediately and automatically tested to ensure their integrity. Such a capability, if available, would be highly useful in enabling the new rule to be either stored by the system if it passes the integrity check, or immediately removed from the system if it does not.

SUMMARY

The present disclosure relates to a rules collector system and method. In one embodiment the system includes a rules retrieval coordinator responsive to an input from an individual and adapted to provide relevant information to the individual, based on the input. The rules retrieval coordinator enables a bidirectional information exchange, which can be viewed as a "conversation", with the individual. The system also includes a rules input processor for monitoring responses from the individual during the bidirectional information exchange with the rules retrieval coordinator. In one embodiment the rules input processor includes voice recognition hardware and software that enables the interviewer to enter rules directly into the rules engine while performing an interview with an individual who may or may not be an expert in a given subject matter.

The rules input processor generates one of a plurality of different outputs depending on the responses (i.e., inputs) from the individual. A rules generator responsive to the rules input processor is adapted to form a new rule, if needed, based on the responses from the individual. A rule integrity check subsystem is used for automatically checking an integrity of the new rule based on pre-existing rules stored in a rule.

In various exemplary embodiments the system also may include a rules format definition application that the individual may access to change the format of a rule that is to be generated with a rules engine. A rules engine may be used to store the updated rule (or rules). A situational test generator may be used to test the newly created rule to see if it provides an expected answer, based on one or more inputs that form a specific situation. If the new rule passes the situational test, then it is maintained in the rules engine; if not, then it is deleted from the rules engine.

In various embodiments the individual, who may be an expert in a given field (or possibly not an expert), may provide responses to the rules retrieval coordinator that will be interpreted as various commands. For example, a response may be interpreted by the system as a command to access an archive to retrieve a previously stored information exchange record so that the record may be further operated on and updated. Other commands may be to change the format of an existing rule or to create a new rule, or to stop an information exchange session. These commands may be entered in through a computer keyboard, or may be entered via a speech recognition system that is integrated into the computer based rules engine.

The various embodiments and methods all enable real time creation and updating of rules that can be used to create a significantly more powerful knowledge based rules collection system and method. The system and method enables more effective use of rules to assist individuals in decision making processes. The system and method further enables the sharing and harnessing of knowledge of other individuals who have made prior use of the system, and enables new users to build upon prior conversations of other individuals, to help formulate new rules that can help automate decision processes. In an enablement that uses a speech recognition system the speed and ease of conversational mode questioning can be further enhanced.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
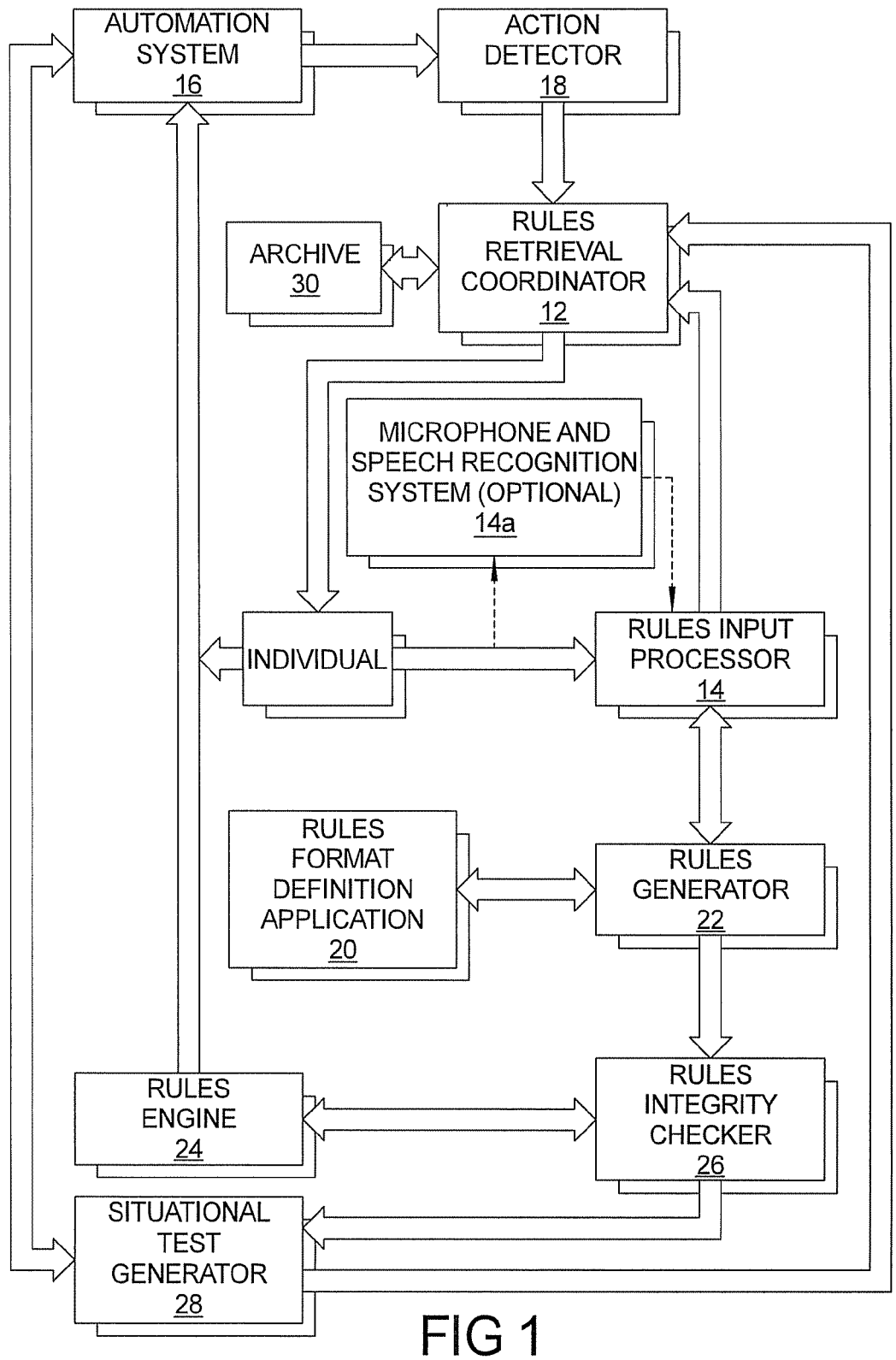
FIG. 1 is a block diagram of one embodiment of a rules collector system in accordance with the present disclosure.

Referring to FIG. 1, an embodiment of a rules collector system 10 in accordance with the present disclosure is shown. The system 10 generally includes a rules retrieval coordinator 12, a rules input processor 14, which may optionally include a microphone and speech recognition system 14a (including both hardware and associated speech recognition software), an automation system 16, an action detector 18, a rules format definition application 20, a rules generator 22 and a rules engine 24. In various embodiments a rules integrity checker 26, a situational test generator 28 and an archive 30 are also included.

An individual, in this example someone who may or may not have particular or extensive experience and knowledge in a given area, may provide an input to the rules retrieval coordinator 12. The action detector 18 detects an input provided by the individual to the automation system 16. The automation system 16, upon receiving an input from the action detector 18, initiates an information exchange session (i.e., a "conversation") with the individual. In this regard the rules retrieval coordinator 12 may be used to provide relevant information back to the individual that relates to the field or subject of the expert's input. For example, a data analyst may visually validate an airport map produced from multiple input files by an external, automated rules-based system, or possibly produced previously by the system 10. The individual may find that one of the input files was not taken into account by the external system (or possibly by the system 10), resulted in an error on the airport map. As the individual starts to correct the error using a visual editor, the action detector 18 of the system 10 sends a message to the rules retrieval coordinator 12 to initiate the rule retrieval session. The rules retrieval coordinator 12 will then send a message to the individual asking the individual to identify what went wrong, and may then formulate a new rule, based on the individual's answer, to prevent this situation in the future. For example, the input file may have been ignored by the system 10 because it included a new type of data that was not expected by a set of existing rules. Another example could be that the input file consisted of text descriptions where a choice of words did not match a set of keywords currently provided by the rules engine 24. The rules retrieval coordinator 12 will ask the individual to provide a new rule or to add keywords and associate the input file with the new rule or keywords to successfully automate processing such a file in the future.

The individual's responses are input to the rules input processor 14, for example via a keyboard or other manually manipulated input device, or possibly via voice commands that are received and processed by the microphone and speech recognition system 14a. The rules input processor 14 looks for specific types of responses from the individual and based on the response received, provides one of four distinct inputs: 1) an input to the rules retrieval coordinator 12; 2) an input to the rules generator 22; 3) an input to the rules format definition file application 20; or 4) an input to the archive 30. An input to the rules retrieval coordinator 12 begins an information exchange session with the rules retrieval coordinator. For example, the input to the rules input processor may be interpreted as a command to elaborate on a specific piece or type of information. In response, the rules retrieval coordinator 12 would respond with additional relevant questions to the individual, thus beginning or carrying on a "conversation" with the individual.

The input to the rules input processor 14 may also be interpreted as new information that is to be applied to form a new rule. Accordingly, the rules input processor 14 generates an output to the rules generator 22. The rules generator 22 may use the rules format definition application 20 to formalize the data/information into a new rule.

The input to the rules input processor 14 may also be interpreted as a command to change the rules format definition file 20 so that new rules generated by the rules generator 22 will be in formed in accordance with the new definition.

The input to the rules input processor 14 may also be interpreted as a command to modify a preexisting rule, or alternatively a command to form a set of new rules (typically in sequential fashion, one rule at a time).

The input to the rules input processor 14 may also be interpreted as a command to save a record of an information exchange (i.e., conversation) to the archive 30, or a command to obtain a previously saved record of an information exchange from the archive 30.

If the rules integrity checker 26 is included, then the integrity of a new rule or a modified rule may be checked by interfacing the rules generator 22 to the integrity checker. The integrity checker 26 may, for example, look for initial state duplications, where the same initial states will produce different results. For example, the expert may add a new rule: "Airport map must have at least one runway". If there is already in the rules engine system 10 another rule like "Airport map must have zero or more runways", the integrity check will find the new rule conflicting with the existing rule. The expert will then be asked by the rules retrieval coordinator 12 to resolve the issue by changing or removing one of the rules, and then in its own turn will go through another integrity check.

Still further, if the situational test generator 28 is included, then a new rule (or modified pre-existing rule) can be tested in a specific context to determine if it produces a predicted result. For example, assume that one of the input files was not taken into account by an external rules-based system, or possibly even by the system 10, and this resulted in a data error on the map. During the interaction session with the individual, the system 10 captures the situation including input factors and expected output factors. After new rules or keywords have been added to the rules engine 24, the situational test generator 28 may feed the system 10 with all of the same input files again. This time the system 10 will check the expected output factor that was missing before.

The situational test generator 28 may be coupled to the rules retrieval coordinator 12 for bi-directional communication so that the rules retrieval coordinator can be informed immediately when a new (or modified) rule has passed a situational test. This information can then be used by the rules retrieval coordinator 12 in formulating responses to inputs from the individual during a given conversation with the individual.

Figure 2A:
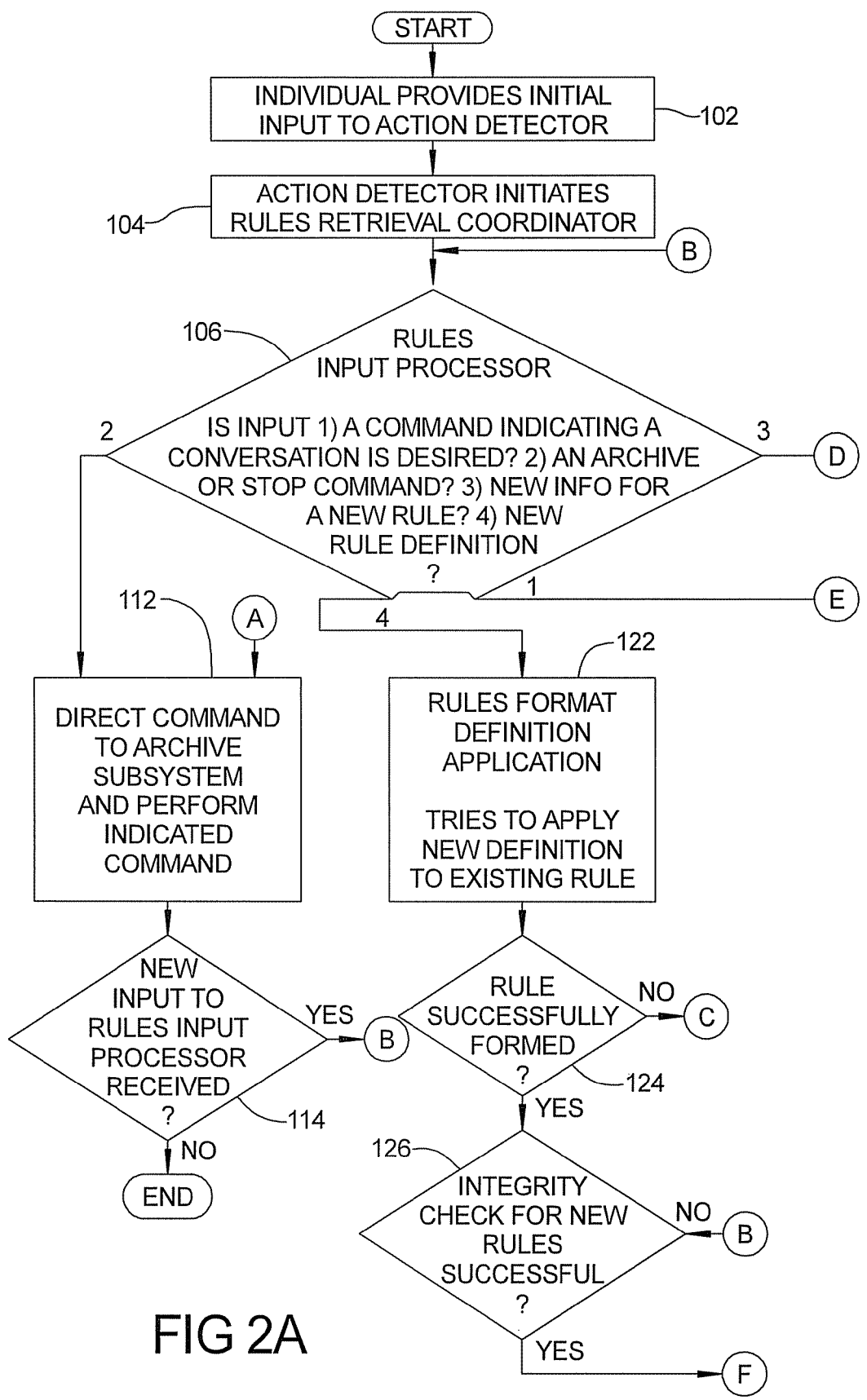
FIGS. 2A and 2B is a flowchart of major operations performed by the rules collector system of FIG. 1 in facilitating different types of inputs from an individual.
Figure 2B:
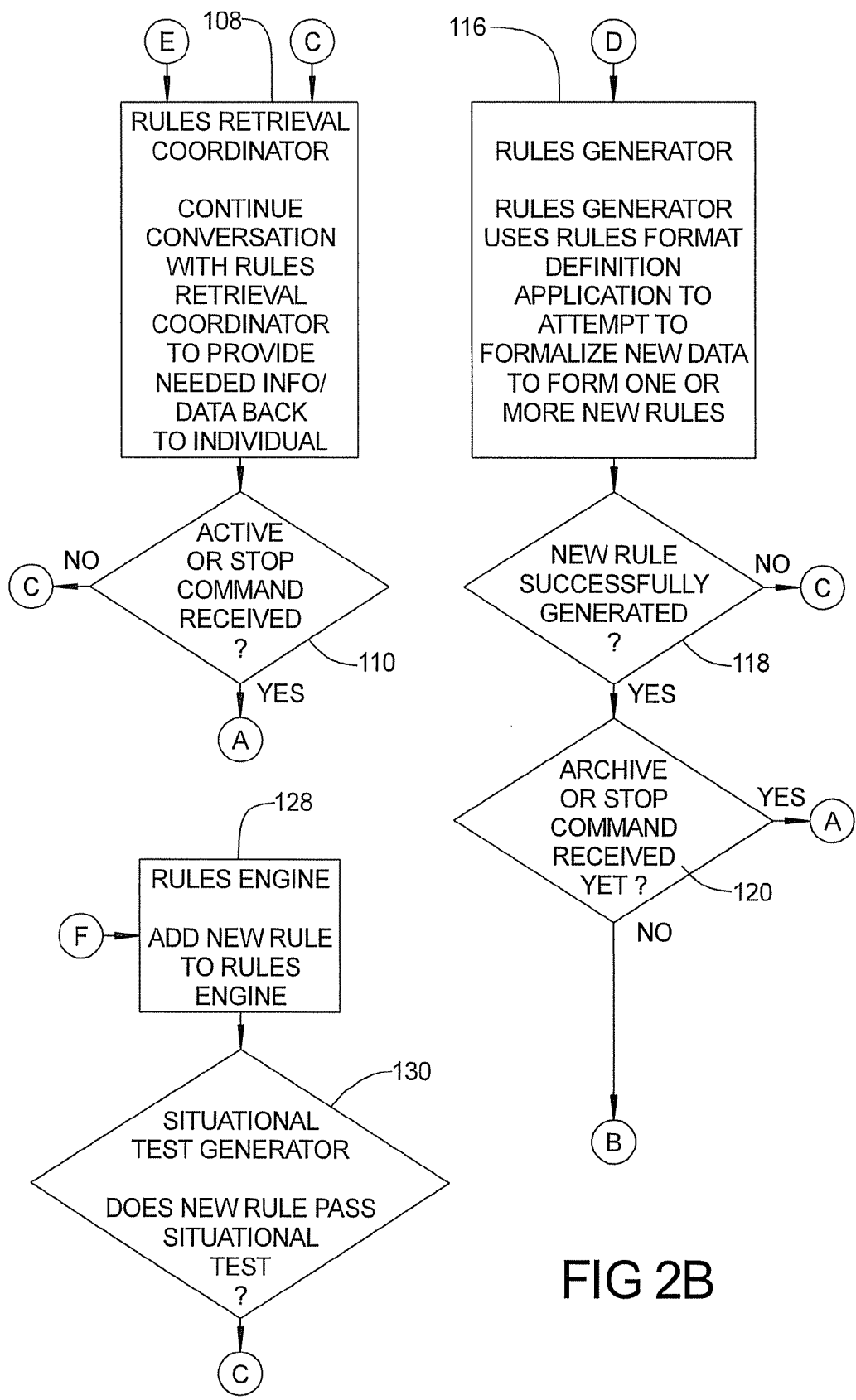

Referring to FIGS. 2A and 2B, a flowchart 100 is shown that outlines more fully the various operational sequences that may be performed by the system 10. At operation 102 the individual provides an input (possibly via a keyboard or touchscreen, not shown) to the action detector 18. At operation 104 the action detector 18 signals to the rules retrieval coordinator 12 that the individual has accessed the system 10. At operation 106 the rules input processor 14 determines if the input from the individual is: 1) a command indicating a conversation is desired; 2) an archive or stop command; 3) new information for a new rule; or 4) a new rule definition.

If the inquiry at operation 106 indicates that a command has been received to start a conversation, then at operation 108 the rules retrieval coordinator 12 generates questions or information that depends on the prior response from the individual. This action essentially forms a conversation with the individual where the individual is providing responses to the rules retrieval coordinator 12 that pertains to specific rules being provided by the rules retrieval coordinator 12, which the rules retrieval coordinator uses to further determine and refine which additional rules should be presented to the individual. Thus, a bidirectional "conversation" with the individual is carried on that forms a record that can be saved and used by the individual at a later date, or used by other individuals at a later date. The system 10 periodically checks to determine if a "stop" or "archive" command has been received, as indicated at operation 110, and if so performs the requested command at operation 112. If not, then conversation with the rules retrieval coordinator continues, as indicated by jump indicator "C".

If the rules input processor 14 determines that the inquiry at operation 106 is a "save or "archive" command, then the command may be immediately performed at operation 112. A check may then be made if a new input to the rules input processor has been received, as indicated at operation 114, and if so, a jump back to operation 106 is performed as indicated by jump indicator "B".

If the rules input processor 14 at operation 106 determines that the individual is presenting new information to form a new rule, then the rules generator 22 accesses the rules definition format application 20, as indicated at operation 116. The system 10 uses information from the rules definition format application 20 in an attempt to formulate a new rule. A check is then made if the new rule was successfully generated, as indicated at operation 118. If not, the system 10 continues to the conversation, as indicated by jump indicator "C" and operation 108, in an effort to obtain additional data/information from the individual that may be required to successfully formulate a new rule. If the new rule was successfully formulated, then a check is made to see if the "archive" or "stop" commands have been received, as indicated at operation 120, and if so, appropriate action is taken to either archive the conversation or to stop the conversation. If no "archive" or "stop" command has been received, then the system 10 continues, at operation 106, to look for inputs from the individual.

If the inquiry at operation 106 indicates that an input has been received by which the individual is commanding a new definition for an existing rule, then the rules format definition application 20 attempts to apply the new rule definition to an existing rule or rules, as indicated at operation 122, using the rules generator 22. A check is then made if the rule was successfully formed, as indicated at operation 124. If not, then the system 10 jumps (via jump indicator "C") to operation 108 in an attempt to obtain additional conversation with the individual that may help to ultimately permit a new rule definition to be implemented. If the inquiry at operation 124 produces a "Yes" answer, then an integrity check on the newly defined rule may be performed at operation 126 using the rules integrity checker 26. If the integrity check passes, the newly defined rule can be added to the rules engine 24, as indicated at operation 128. The newly defined rule may then be tested using the situational test generator 28 at operation 130. If this test is passed, then the system 10 may continue operation with the rules input processor 14 looking for additional new inputs from the individual at operation 106. If the integrity test at operation 126 produces a "No" answer, then the system 10 jumps back to operation 106 where the rules input processor 106 looks for another command from the individual.

From the foregoing, it will be appreciated that the system 10 enables an intelligent, bidirectional communication exchange (i.e., conversation) with the individual that can serve to significantly enhance the knowledge base of the system 10. As additional individuals make use of the system 10 and populate the rules generator with different rules, data and information, the capability of the system 10 to handle increasingly complex rules-based situations, scenarios and inquiries, increases. A particular advantage of the system 10 is its ability to facilitate a conversation or dialogue with the individual that enables the system 10 to obtain relevant information needed to formulate or update existing rules in its rules engine 24.

The system 10 further provides the significant advantage of enabling an individual to simulate a specific test or situation, by inputting the specific rules that would need to be followed in a real world implementation, and obtaining the results from the test or simulation. The system 10 is thus able to save expense and time in various manufacturing and test operations by enabling individuals to first test situations and rules before going to the expense of simulating the test or other human action.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A rules collector system implemented on a computing system, the rules collector system comprising:
    a rules retrieval coordinator responsive to an input from an individual and adapted to provide relevant information to said individual based on said input and to enable a bidirectional information exchange with said individual;
    a rules input processor for monitoring responses from said individual and generating one of a plurality of different outputs depending on said responses;
    a rules generator responsive to said rules input processor for forming a new rule based on said responses from said individual;
    a rule integrity check subsystem for automatically checking an integrity of said new rule based on pre-existing rules to ensure that a rule conflict does not exist with either a pre-existing rule or a new rule that said individual has input;
    when a rule conflict is detected, notifying the individual of the conflict; and
    further comprising an action detector adapted to detect that an individual accesses said rules retrieval coordinator.

2. The system of claim 1, further comprising a rules generator responsive to said rules input processor for constructing a new rule based on said responses by said individual.

3. The system of claim 1, further comprising a rules engine for storing said new rule.

4. The system of claim 1, further comprising an archive for storing records of information exchanges between said individual and said rules retrieval coordinator, where said records of information can be further used by said individual.

5. The system of claim 1, further comprising a rules engine for holding a collection of rules accessible by said system during communications with said individual.

6. The system of claim 5, further comprising a situational test generator for carrying out a situational test of a new rule having been added to said rules engine, to enable verification of operation of said new rule.

7. The system of claim 1, further comprising a rules format definition file accessible by said individual to enable modification, by said individual, of a format of a rule accessible by said rules retrieval coordinator.

8. The system of claim 1, wherein said rules input processor includes a speech recognition system for recognizing voice commands from said individual.

9. An interactive rules collector system implemented on a processor, the interactive rules collector system comprising:
    a rules retrieval coordinator responsive to an input from an individual and adapted to provide relevant information to said individual based on said input and to enable a conversational, bidirectional information exchange with said individual;

a rules input processor for monitoring responses from said individual and generating one of a plurality of different outputs depending on said responses;

a rules format definition application for enabling said individual to define a new rule format for a new rule;

a rules generator responsive to said rules input processor for forming a new rule based on said responses from said individual and said new rule format;

a rules integrity check subsystem for automatically checking an integrity of said new rule against pre-stored rules and against a new rule that said individual has input to ensure that a rule conflict does not exist;

when a rule conflict is detected, notifying the individual of the conflict; and further comprising an action detector adapted to detect that an individual accesses said rules retrieval coordinator.

10. The system of claim 9, further comprising:
an archive accessible by said individual for storing conversational information exchanges between said individual and said rules retrieval coordinator.

11. The system of claim 9, further comprising a rules engine adapted to store said new rule with previously created rules.

12. The system of claim 9, wherein said rules generator is adapted to communicate with said rules format definition application to enable said individual to change a format of a preexisting rule contained within said rules engine.

13. A method using a processing system for collecting and updating rules to automate a decision making process, comprising:
accessing a rules retrieval coordinator that is responsive to an input from an individual, to provide relevant information to said individual based on said input and to enable a bidirectional information exchange with said individual;

using a rules input processor to monitor responses from said individual and to generate one of a plurality of different outputs depending on said responses;

using an output from said rules input processor to form a new rule based on said responses from said individual received by said rules input processor;

automatically checking an integrity of said new rule to ensure that a rule conflict does not exist with either a pre-existing rule or a new rule that said individual has input;

when a rule conflict is detected, notifying the individual of the conflict, and further comprising an action detector adapted to detect that an individual accesses said rules retrieval coordinator.

14. The method of claim 13, further comprising storing said new rule in a rules engine for future use.

15. The method of claim 13, further comprising storing said bidirectional information exchange within an archive for future use by either said individual or a different individual.

16. The method of claim 13, further comprising enabling said individual to at least one of:
define a format for said new rule; and
change a format for a preexisting rule contained in a rules engine accessible by said rules retrieval coordinator.

17. The method of claim 13, further comprising using a rules engine to hold previously defined rules used by said rules retrieval coordinator.

18. The method of claim 13, further comprising testing a situational response of said new rule to verify an expected output of said new rule within a specific situational context.

19. The method of claim 18, further comprising:
if said testing of said situational response provides a positive answer, indicating an acceptable test result, then including said new rule within a rules engine accessible by said rules retrieval coordinator; and
if said testing of said situational response provides a negative answer, indicating that an acceptable test result was not received, then not including said new rule in said rules engine.

* * * * *